United States Patent
Urakawa et al.

(10) Patent No.: US 12,322,285 B2
(45) Date of Patent: Jun. 3, 2025

(54) INFORMATION ACQUISITION METHOD AND VEHICULAR SYSTEM

(71) Applicant: Aichi Steel Corporation, Tokai (JP)

(72) Inventors: Kazuo Urakawa, Tokai (JP); Shogo Okazaki, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 121 days.

(21) Appl. No.: 18/552,669

(22) PCT Filed: Mar. 23, 2022

(86) PCT No.: PCT/JP2022/013686
§ 371 (c)(1),
(2) Date: Sep. 27, 2023

(87) PCT Pub. No.: WO2022/210201
PCT Pub. Date: Oct. 6, 2022

(65) Prior Publication Data
US 2024/0185711 A1 Jun. 6, 2024

(30) Foreign Application Priority Data
Apr. 1, 2021 (JP) .................................. 2021-062804

(51) Int. Cl.
*G08G 1/042* (2006.01)
*G08C 17/02* (2006.01)
(Continued)

(52) U.S. Cl.
CPC ............. *G08G 1/042* (2013.01); *G08C 17/02* (2013.01); *G08G 1/0116* (2013.01); *H04Q 9/00* (2013.01); *H04Q 2209/47* (2013.01)

(58) Field of Classification Search
CPC .... G08G 1/042; G08G 1/0116; G08G 1/0145; G08G 1/02; G08G 1/096758;
(Continued)

(56) References Cited

U.S. PATENT DOCUMENTS 8,022,811 B2 * 9/2011 Konuma ................. G06K 17/00
377/37
8,749,376 B2 * 6/2014 Ukita .................. G06Q 10/0833
340/539.13
(Continued)

FOREIGN PATENT DOCUMENTS

| JP | H11-312294 A | 11/1999 |
| JP | 2017-141594 A | 8/2017 |

(Continued)

OTHER PUBLICATIONS

Extended European Search Report issued Feb. 18, 2025 in European Patent Application No. 22780415.0.
(Continued)

*Primary Examiner* — Omar Casillashernandez
(74) *Attorney, Agent, or Firm* — XSENSUS LLP

(57) ABSTRACT

In a vehicular system for a vehicle in which a tag reader for acquiring tag information from a wireless tag is disposed on a front side of a magnetic sensor array to acquire tag information of wireless tag affixed to a magnetic marker laid in a traveling road, after the tag reader acquires the tag information from any wireless tag, when any magnetic marker is detected at a predetermined timing, a process of associating the tag information with the magnetic marker is performed, and information transmitted from the wireless tag is thereby acquired with high reliability.

20 Claims, 10 Drawing Sheets

(51) Int. Cl.
*G08G 1/01* (2006.01)
*H04Q 9/00* (2006.01)

(58) Field of Classification Search
CPC .... G08G 1/096783; G08G 1/09; G08C 17/02; G08C 17/00; G08C 19/00; H04Q 9/00; H04Q 2209/47; E01F 9/30; E01F 11/00; G01C 21/28
USPC .......................................................... 340/941
See application file for complete search history.

(56) References Cited

U.S. PATENT DOCUMENTS

| | | |
|---|---|---|
| 2019/0212169 A1 | 7/2019 | Yamamoto et al. |
| 2020/0012294 A1 | 1/2020 | Yamamoto et al. |
| 2020/0133299 A1 | 4/2020 | Yamamoto et al. |
| 2020/0285822 A1 | 9/2020 | Yamamoto |
| 2021/0081624 A1* | 3/2021 | Kovarik ............. G06K 7/10376 |
| 2021/0230822 A1 | 7/2021 | Yamamoto et al. |
| 2024/0183986 A1* | 6/2024 | Tsuji ............... B60W 60/00253 |

FOREIGN PATENT DOCUMENTS

| | | |
|---|---|---|
| JP | 2018-169301 A | 11/2018 |
| JP | 2019-067353 A | 4/2019 |
| WO | 2019/239825 A1 | 12/2019 |

OTHER PUBLICATIONS

International Search Report and Written Opinion mailed on Jun. 14, 2022, received for PCT Application PCT/JP2022/013686, filed on Mar. 23, 2022, 8 pages including English Translation.

* cited by examiner

INFORMATION ACQUISITION METHOD AND VEHICULAR SYSTEM

CROSS-REFERENCE TO RELATED APPLICATIONS

The present application is based on PCT filing PCT/JP2022/013686, filed Mar. 23, 2022, which claims priority to Japanese Patent Application No. 2021-062804, filed Apr. 1, 2021, the entire contents of each are incorporated herein by reference.

TECHNICAL FIELD

The present invention relates to an information acquisition method for acquiring, with high reliability, tag information outputted from a wireless tag affixed to a magnetic marker, and a vehicular system.

BACKGROUND ART

Conventionally, a system has been suggested in which driving assists for a vehicle including automatic driving are achieved by using magnetic markers laid along a road (for example, refer to Patent Literature 1). Furthermore, a system has also been suggested that is configured so that more information can be provided from a magnetic marker side to a vehicle side by affixing a wireless tag to at least part of magnetic markers (for example, refer to Patent Literature 2).

The wireless tag in this system outputs, for example, position information of its corresponding magnetic marker via wireless communication. On the vehicle side, when any magnetic marker is detected, position information outputted from its corresponding wireless tag is received, and the position of that magnetic marker can be thereby identified. On the vehicle side, with reference to the position-identified magnetic marker, the current position can be identified. By using the magnetic marker with the wireless tag affixed thereto, the current position can be identified with high accuracy irrespective of positioning accuracy by GNSS (Global Navigation Satellite System) or the like. For example, for driving assists by a navigation system or the like, highly-accurate route guiding can be made even between buildings in an urban area, in a tunnel, or the like, where the reception condition of radio waves is not so favorable.

CITATION LIST

Patent Literatures

Patent Literature 1: Japanese Unexamined Patent Application Publication No. 2017-141594
Patent Literature 2: Japanese Unexamined Patent Application Publication No. 2018-169301

SUMMARY OF INVENTION

Technical Problem

However, the above-described conventional system including a magnetic marker with a wireless tag affixed thereto has the following problem. That is, for example, transmission radio waves are required to be strengthened so that communication with the wireless tag can be made without missing during vehicle's traveling. Thus, radio wave interference tends to occur. When any magnetic marker is detected, there is a possibility that information transmitted from its corresponding tag information cannot be acquired on a vehicle side with high reliability.

The present invention was made in view of the above-described conventional problem, and is to provide, in a system including a magnetic marker with a wireless tag affixed thereto, a method or system capable of acquiring information transmitted from the wireless tag with high reliability.

Solution to Problem

One mode of the present invention resides in an information acquisition method for a vehicle including a magnetic sensor to acquire tag information outputted from a wireless tag affixed to a magnetic marker which is at least part of a plurality of magnetic markers arrayed along a traveling road, wherein
  in the vehicle, a tag reader for acquiring the tag information by causing the wireless tag to operate by wireless power feeding is disposed on a front side of the magnetic sensor in a longitudinal direction of the vehicle, and
  after the tag reader acquires the tag information of any wireless tag, when the magnetic sensor detects any magnetic marker at a predetermined timing, a process of associating the tag information with the any magnetic marker is performed, and
  after the tag information of the any wireless tag is acquired, when the magnetic sensor cannot detect the any magnetic marker at the predetermined timing, the tag information is erased without performing the process of associating the tag information.

One mode of the present invention resides in a vehicular system for a vehicle including a magnetic sensor to acquire tag information outputted from a wireless tag affixed to a magnetic marker which is at least part of a plurality of magnetic markers arrayed along a traveling road, wherein
  in the vehicle, a tag reader for acquiring the tag information by causing the wireless tag to operate by wireless power feeding is disposed on a front side of the magnetic sensor in a longitudinal direction of the vehicle, and
  the system includes a circuit which performs, after the tag reader acquires the tag information of any wireless tag, when the magnetic sensor detects any magnetic marker at a predetermined timing, a process of associating the tag information with the any magnetic marker is performed, and
  erases, after the tag information of the any wireless tag is acquired, when the magnetic sensor cannot detect the any magnetic marker at the predetermined timing, the tag information without performing the process of associating the tag information.

Advantageous Effects of Invention

The information acquisition method and the vehicular system according to the present invention is a method or system to be applied to a vehicle in which a tag reader on the vehicle body is disposed ahead of magnetic sensors. In the present invention, when any magnetic marker is detected at a predetermined timing after the tag reader acquired the tag information of any wireless tag, a process of associating tag information with that magnetic marker is performed. On the other hand, when no magnetic marker is detected at the predetermined timing, the process of associating the acquired tag information is not performed, and the tag information is erased. According to the present invention, it is possible to reduce the possibility that the information acquired from the wireless tag is erroneously associated with a magnetic marker not corresponding to that wireless tag.

As described above, according to the information acquisition method and the vehicular system of the present invention, when the vehicle detects a magnetic marker with a wireless tag affixed thereto, tag information corresponding to that magnetic marker can be acquired with high reliability.

DESCRIPTION OF EMBODIMENTS

Embodiments of the present invention are specifically described by using the following embodiments.

First Embodiment

The present embodiment is an example regarding information acquisition method for acquiring tag information outputted from RFID tag (Radio Frequency Identification Tag, wireless tag) 15 affixed to magnetic marker 10, and vehicular system 1. Details of this are described by using FIG. 1 to FIG. 9.

Figure 1:
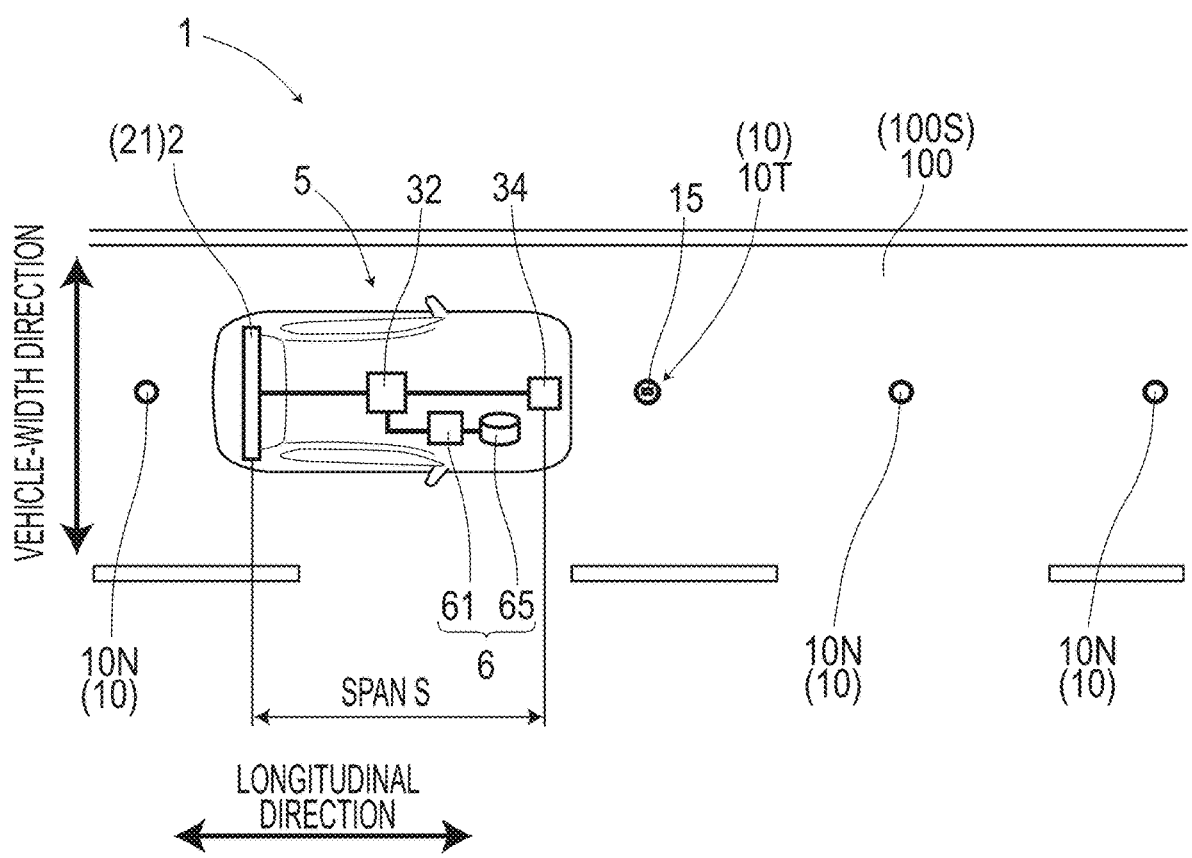
FIG. 1 is a diagram of configuration of a vehicular system in a first embodiment.

Vehicular system 1 is configured to include, as in FIG. 1, tag reader 34 which acquires tag information from RFID tag 15 affixed to magnetic marker 10, measuring unit 2 which detects magnetic marker 10, and control unit 32 which controls tag reader 34 and measuring unit 2. By using the tag information of RFID tag 15, vehicular system 1 acquires position information of its corresponding magnetic marker 10 to identify an own vehicle position, which is a position where vehicle 5 is located.

Note in the drawing that a reference sign of a magnetic marker with RFID tag 15 affixed thereto is set as 10T so as to allow distinction from a magnetic marker (reference sign 10N) without RFID tag 15 affixed thereto. In the description of the present embodiment, while a magnetic marker with RFID tag 15 affixed thereto is referred to as a tag-equipped marker and a magnetic marker without RFID tag affixed thereto is referred to as a tag-unequipped marker, a magnetic marker irrespective of whether RFID tag 15 is affixed is referred to as a magnetic marker (its reference sign is 10).

In the present embodiment, this vehicular system 1 is combined with navigation system 6 (FIG. 1). Navigation system 6 is a system configured to include navigation ECU 61 achieving navigation functions and map database (map DB) 65 having detailed three-dimensional map data (3D map data) stored therein. By using the own vehicle position identified by vehicular system 1, navigation ECU 61 performs display of a map of the surrounding area; route guiding by screen display, audio outputs, or the like; and so forth.

In the following, after magnetic marker 10 to be laid in a road (traveling road) where vehicle 5 travels is described, details of tag reader 34, measuring unit 2, and control unit 32 are described.

Magnetic marker 10 is, as in FIG. 1, a road marker laid in road surface 100S of a road forming a traveling road of vehicle 5. Magnetic markers 10 are arrayed along the center of lane 100 sectioned with left and right lane marks with, for example, two-meter pitches.

Figure 2:
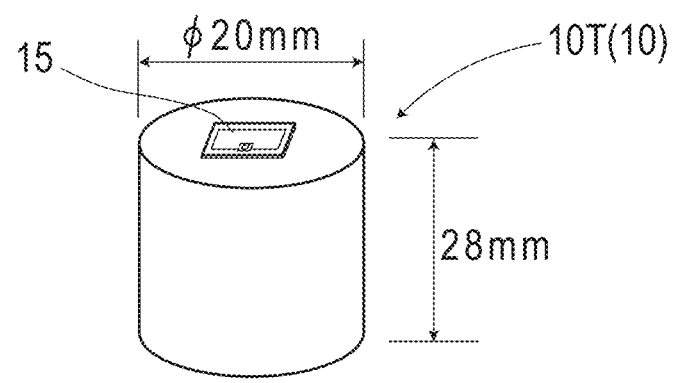
FIG. 2 is a diagram depicting a magnetic marker (tag-equipped marker) equipped with an RFID tag in the first embodiment.

Magnetic marker 10 is, as in FIG. 2, a permanent magnet forming a columnar shape having a diameter of 20 mm and a height of 28 mm. Magnetic marker 10 can be accommodated in a hole provided in road surface 100S. The magnet forming magnetic marker 10 is an isotropic ferrite plastic magnet having magnetic powder of iron oxide as a magnetic material dispersed into a polymer material as a base material, and has a characteristic of a maximum energy product (BHmax)=6.4 KJ/m$^3$. This magnetic marker 10 is laid in a state of being accommodated in a hole bored in road surface 100S. Magnetic marker 10 of the present embodiment has magnetic flux density Gs of the surface of 45 mT (milliteslas). This magnetic marker 10 can act magnetism with a magnetic flux density of 8 μT (microteslas) at a height of 250 mm, which is an upper limit of a range of 100 mm to 250 mm assumed as an attachment height of measuring unit 2.

Figure 3:
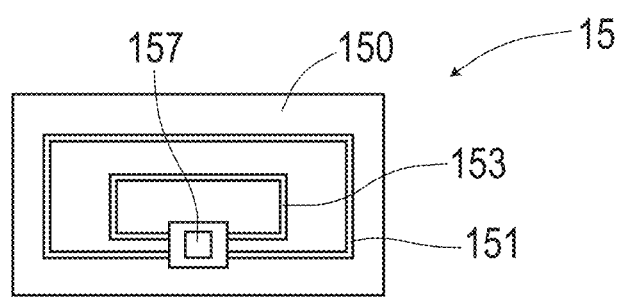
FIG. 3 is a front view of the RFID tag in the first embodiment.

On tag-equipped marker 10T, which is part of magnetic markers 10, as in FIG. 2 and FIG. 3, RFID tag 15 which wirelessly outputs information is laminated and arranged at one end face. This RFID tag 15 is a passive-type tag, operates by external wireless power feeding, and outputs tag information including a tag ID as identification information. The tag ID is identification information of RFID tag 15, and can be used to identify its corresponding tag-equipped marker 10T.

Tag-equipped marker 10T, which is magnetic marker 10 with RFID tag 15 affixed thereto, is laid in the traveling road so that RFID tag 15 is positioned upward. Tag-equipped marker 10T may be laid, for example, every ten locations or five locations, of magnetic markers 10 arrayed as spaced along the road, or may be laid at a characteristic location on the road, such as a branching point, merging point, or temporary stop point.

RFID tag 15 is, as in FIG. 3, an electronic component with IC chip 157 implemented on a surface of tag sheet 150 cut out from, for example, a PET (PolyEthylene Terephthalate) film. On the surface of tag sheet 150, a printed pattern of loop coil 151 and antenna 153 is provided. Loop coil 151 is a power-receiving coil where exciting current is generated by external electromagnetic induction. Antenna 153 is a transmission antenna for wireless transmission of tag information. As RFID tag 15, a UHF-band wireless tag is preferably adopted.

Next, tag reader 34, measuring unit 2, and control unit 32 included in vehicle 5 are described.

Figure 4:
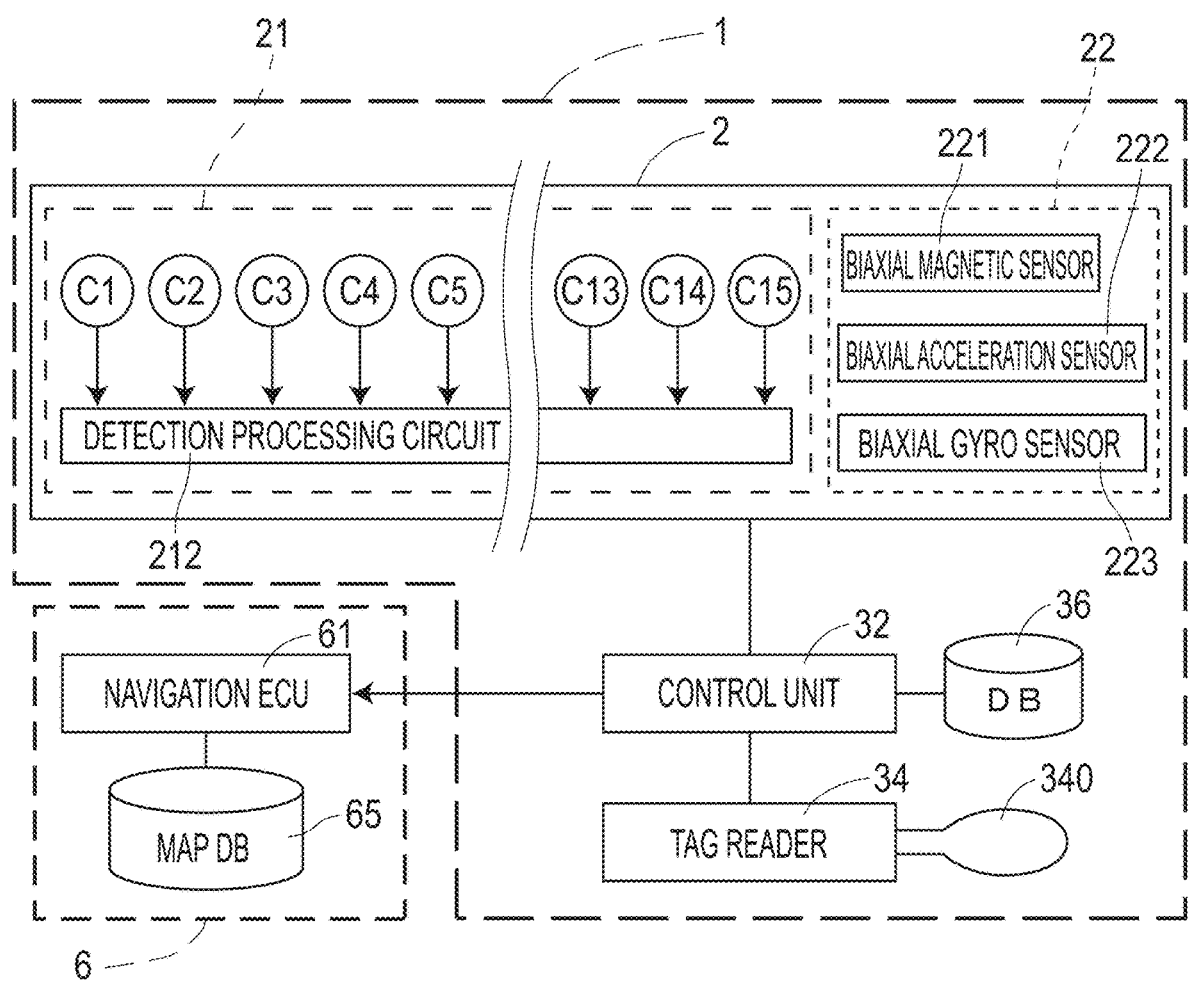
FIG. 4 is a block diagram depicting an electrical configuration of the vehicular system in the first embodiment.

Tag reader 34 is, as in FIG. 1 and FIG. 4, a communication unit including wireless antenna 340. Tag reader 34 is arranged, for example, on a front part of vehicle 5, such as inside the front bumper of vehicle 5. Tag reader 34 is arranged at the center in a vehicle-width direction inside the front bumper.

Tag reader 34 performs wireless communication process (tag information acquisition process, which will be described further below by using FIG. 5) with RFID tag 15 affixed to tag-equipped marker 10T. Tag reader 34 causes RFID tag 15 to operate by wireless power feeding to acquire tag information wirelessly transmitted (outputted) from RFID tag 15. Note that tag reader 34 inputs the acquired tag information to control unit 32 as occasion arises.

Measuring unit 2 is, as in FIG. 1 and FIG. 4, a unit with sensor array 21 including magnetic sensors Cn and IMU (Inertial Measurement Unit) 22 allowing positioning by inertial navigation integrated together. Measuring unit 2 is an elongated rod-shaped unit. Measuring unit 2 is attached to, for example, the inside of the rear bumper of vehicle 5, so as to be along the vehicle-width direction.

Measuring unit 2 is attached in a state of facing road surface 100S in parallel. In the present embodiment, the attachment height of measuring unit 2 with reference to road surface 100S is set at 200 mm. Measuring unit 2 is arranged on a rear side of vehicle 5 with respect to tag reader 34 arranged on the front side of vehicle 5. In this manner, in vehicle 5 of the present embodiment, in a longitudinal direction, tag reader 34 is disposed on a front side with respect to measuring unit 2. Note that span S (refer to FIG. 1), which is a distance between tag reader 34 and measuring unit 2 (sensor array 21) in the longitudinal direction of vehicle 5, is 3.5 m. The value of this span S is stored in control unit 32 as specification information of vehicle 5.

Sensor array 21 (FIG. 4) includes fifteen magnetic sensors Cn (n is an integer of 1 to 15) and detection processing circuit 212 having a CPU (Central Processing Unit) and so forth not depicted incorporated therein. The plurality of magnetic sensors Cn are arrayed on a straight line along a longitudinal direction of measuring unit 2. The pitch between fifteen magnetic sensors Cn is an equidistance of 10 cm. Sensor array 21 is attached to vehicle 5 so that center magnetic sensor C8 is positioned at the center of vehicle 5 in the vehicle-width direction.

Magnetic sensors Cn are sensors which detect magnetism by using the known MI effect (Magnet Impedance Effect) in which the impedance of a magnet-sensitive body such as an amorphous wire sensitively changes in response to the external magnetic field. In magnetic sensors Cn, magnet-sensitive bodies such as amorphous wires are arranged along orthogonal biaxial directions, thereby allowing detection of magnetic components acting in orthogonal biaxial directions. Note in the present embodiment that magnetic sensors Cn are incorporated in magnetic sensor array 21 so as to be able to detect magnetic components in the longitudinal direction and the vehicle-width direction of vehicle 5.

Magnetic sensors Cn are highly-sensitive sensors with a measurement range of magnetic flux density of +0.6 mT and a magnetic flux resolution of 0.02 µT in the measurement range. In the present embodiment, the frequency of magnetism measurement by each magnetic sensor Cn of sensor array 21 is set at 3 kHz so as to be able to support high-speed traveling of the vehicle.

Note herein that magnetic marker 10 can act with magnetism of magnetic flux density equal to or more than 8 µT to positions in the range of 100 mm to 250 mm assumed as the attachment height of magnetic sensors Cn. With magnetic marker 10 acting with magnetism of magnetic flux density equal to or more than 8 µT, detection can be made with high reliability by using magnetic sensors Cn with a magnetic flux resolution of 0.02 µT.

Detection processing circuit 212 (FIG. 4) included in the sensor array 21 is an arithmetic circuit which performs marker detection process (which will be described further below by using FIG. 6 and FIG. 7) for detecting any magnetic marker 10 and so forth. This detection processing circuit 212 is configured, although depictions are omitted, by using a CPU which performs various arithmetic operations, memory elements such as a ROM, RAM and so on, and so forth.

Detection processing circuit 212 acquires a sensor signal outputted from each of magnetic sensors Cn at a frequency of 3 kHz to perform marker detection process. In the marker detection process, in addition to detection of magnetic marker 10, measurement of a lateral shift amount of vehicle 5 with respect to magnetic marker 10, and so forth are performed. After performing the marker detection process, detection processing circuit 212 inputs the result to control unit 32.

IMU 22 (FIG. 4) incorporated in measuring unit 2 is an inertial navigation unit for estimating a relative position of vehicle 5 by inertial navigation. IMU 22 acquires a measurement value required for estimation of a relative position of vehicle 5 by inertial navigation. IMU 22 include biaxial magnetic sensor 221, which is an electronic compass which measures an azimuth; biaxial acceleration sensor 222 which measures acceleration; biaxial gyro sensor 223 which measures angular velocity; and so forth.

Control unit 32 is, as in FIG. 4, a unit which controls tag reader 34 and measuring unit 2 and identifies the own vehicle position (position where vehicle 5 is located) on a real-time basis. Control unit 32 includes an electronic substrate (omitted in the drawing) with a CPU (Central Processing Unit) which performs various arithmetic operations, memory elements such as a ROM and a RAM, and so forth implemented thereon. To control unit 32, a storage device (omitted in the drawing) such as a hard disk drive is connected. Database 36 for storing laying positions of magnetic markers 10 is provided in a storage area of this storage device.

In database 36, tag-equipped marker 10T corresponding to a tag ID as identification information of RFID tag 15 is identified, and position information (one example of unique information) representing the laying position of that tag-equipped marker 10T is stored. Furthermore, in database 36, as information to which the tag ID is linked, position information (one example of unique information) of magnetic markers 10 at, for example, twenty locations, on a downstream side is stored. That is, in database 36, position information as one example of unique information of a magnetic marker is stored and, to that unique information, in a state in which an order in position of the corresponding magnetic marker 10 to the downstream side can be identified by taking tag-equipped marker 10T as a starting point, the tag ID (one example of tag information) of RFID tag 15 of this tag-equipped marker 10T is linked. For example, with reference to database 36 by using the tag ID most recently acquired and information about the number of detection of other magnetic markers 10 (detection count) after passage over tag-equipped marker 10T regarding that tag ID, newly-detected magnetic marker 10 can be identified irrespective of the presence or absence of RFID tag 15, and its position information can be acquired.

Note that as the number of locations of magnetic markers 10 on the downstream side to which the tag ID is to be linked, for example, the number of locations matching an arrangement pitch of tag-equipped markers 10T may be set. For example, the number of locations exceeding the arrangement pitch may be set. In this case, to the position information (which exemplifies unique information) of at least any magnetic marker 10, the tag IDs of RFID tags 15 affixed to a plurality of tag-equipped markers 10T at different positions on an upstream side are linked in parallel. For example, when this arrangement pitch is one for every ten markers, that is, when tag-equipped markers 10T are arranged each with nine tag-unequipped markers 10N placed (interposed) therebetween, if the position information of thirty locations on the downstream side is linked to the tag ID, three tag IDs corresponding to three tag-equipped markers 10T at different position on the upstream side are linked in parallel for each magnetic marker 10. For example, if a case occurs one or twice in which no tag information cannot be associated with tag-equipped marker 10T, it is possible to avoid a situation which immediately disables acquisition of the position information of magnetic marker 10. The position information of tag-equipped marker 10T with which no tag information can be associated can be acquired with reference to database 36 by using the tag ID of tag-equipped marker 10T with which tag information is most recently associated on the upstream side and the number of detection of magnetic markers 10 after passage over this tag-equipped marker 10T.

Control unit 32 is one example of a circuit which achieves functions as each of the following means (a) to (c). The functions as each means are achieved by the CPU executing a software program stored in the above-described memory element.

(a) Period setting means: means which sets, as a period, a temporal range to which a timing when sensor array 21 detects corresponding tag-equipped marker 10T can belong with reference to a time point of acquisition of tag information by tag reader 34.

(b) Associating means: means which associates the tag information acquired by tag reader 34 with tag-equipped marker 10T detected by sensor array 21.

(c) Own-vehicle-position identifying means: means which identifies the own vehicle position, which is a position (current position) where vehicle 5 is located.

Note that, although details will be described further below, a method of identifying the own vehicle position by control unit as (c) own-vehicle-position identifying means varies between a time when magnetic marker 10 is detected and a time when magnetic marker 10 is not detected. Furthermore, even when magnetic marker 10 is detected, the method of identifying the own vehicle position varies between a time when association of tag information with that magnetic marker 10 is performed and a time when association of tag information is not performed.

Next, the operation of vehicular system 1 of the present embodiment is described. As system operation, details of (1) tag information acquisition process by tag reader 34, (2) marker detection process by sensor array 21, and (3) entire operation of vehicular system 1 are sequentially described. (1) Tag information acquisition process and (2) marker detection process are processes to be performed during (3) operation of vehicular system 1.

(1) Tag Information Acquisition Process

The tag information acquisition process is communication process to be performed by tag reader 34 to acquire tag information from RFID tag 15 affixed to tag-equipped marker 10T. In the tag information acquisition process, tag reader 34 transmits, as in FIG. 5, a preamble radio wave, a radio wave obtained by modulating a READ command, and an unmodulated carrier radio wave in this sequence.

Figure 5:
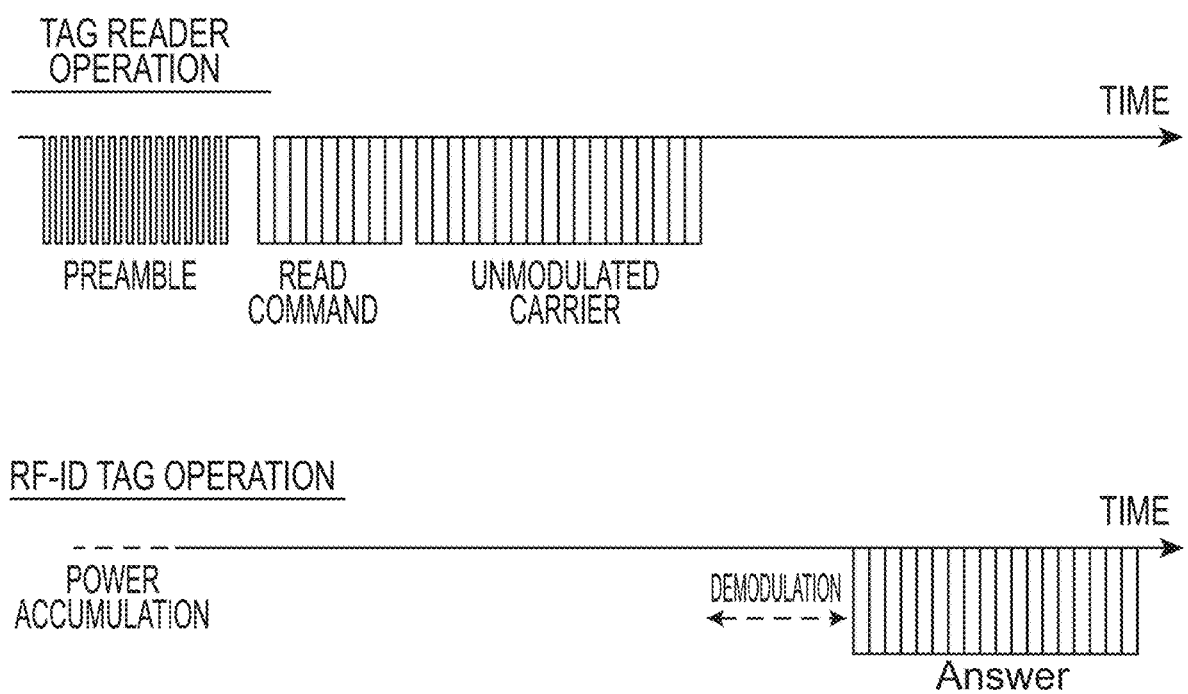
FIG. 5 is a descriptive diagram of tag information acquisition process by a tag reader in the first embodiment.
Figure 6:
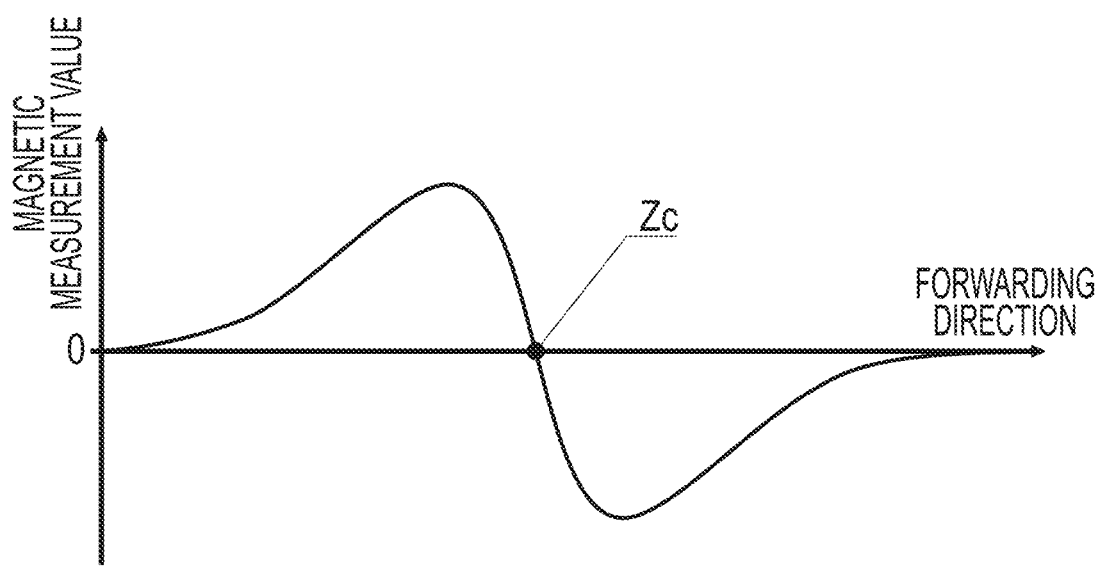
FIG. 6 is a descriptive diagram exemplarily describing changes in a vehicle's forwarding direction of a magnetic measurement value in a longitudinal direction when a vehicle passes over a magnetic marker in the first embodiment.

As in FIG. 5, RFID tag 15 rectifies the preamble radio wave sent from tag reader 34 to accumulate electric power required for IC initial operation, and then, by demodulating the radio wave including the READ command to acquire the READ command and superposing data on a reflected wave of the unmodulated carrier wave, returns (Answer) tag information. Upon acquiring the tag information from RFID tag 15, tag reader 34 inputs the acquired tag information to control unit 32 as occasion arises.

(2) Marker Detection Process

The marker detection process is a process to be performed by detection processing circuit 212 of sensor array 21 by control of control unit 32. In the marker detection process of the present embodiment, detection of magnetic marker 10, measurement of a lateral shift amount of vehicle 5 with respect to detected magnetic marker 10, and so forth are performed.

As described above, each magnetic sensor Cn configuring sensor array 21 is configured to measure magnetic components in the longitudinal direction and the vehicle-width direction of vehicle 5. For example, when any magnetic sensor moves in the forwarding direction of vehicle 5 and passes directly above magnetic marker 10, the magnetic measurement value in the longitudinal direction changes so that its sign is reversed before and after magnetic marker 10 as in FIG. 6 and the magnetic measurement value crosses zero at a position directly above magnetic marker 10. During traveling of vehicle 5, when zero-cross Zc where its sign is reversed occurs for a magnetic measurement value in the longitudinal direction detected by any magnetic sensor, it can be determined that measurement unit 2 is positioned directly above magnetic marker 10. Detection processing circuit 212 determines that magnetic marker 10 is detected when the measurement unit 2 is positioned directly above magnetic marker 10 and zero-cross Zc of the magnetic measurement value in the longitudinal direction occurs as described above.

Also, for example, as for magnetic sensors with specifications similar to those of magnetic sensors Cn, when movement along a virtual line in the vehicle-width direction passing over directly above magnetic marker 10 is assumed, the sign of the magnetic measurement value in the vehicle-width direction is reversed on both sides interposing magnetic marker 10, and the value is changed so as to cross zero at a position directly above magnetic marker 10. In measurement unit 2 having fifteen magnetic sensors Cn arrayed in the vehicle-width direction, the sign of magnetic measurement value in the vehicle-width direction to be detected by magnetic sensor Cn varies depending on which side the magnetic sensor is present via magnetic marker 10 (refer to FIG. 7).

Figure 7:
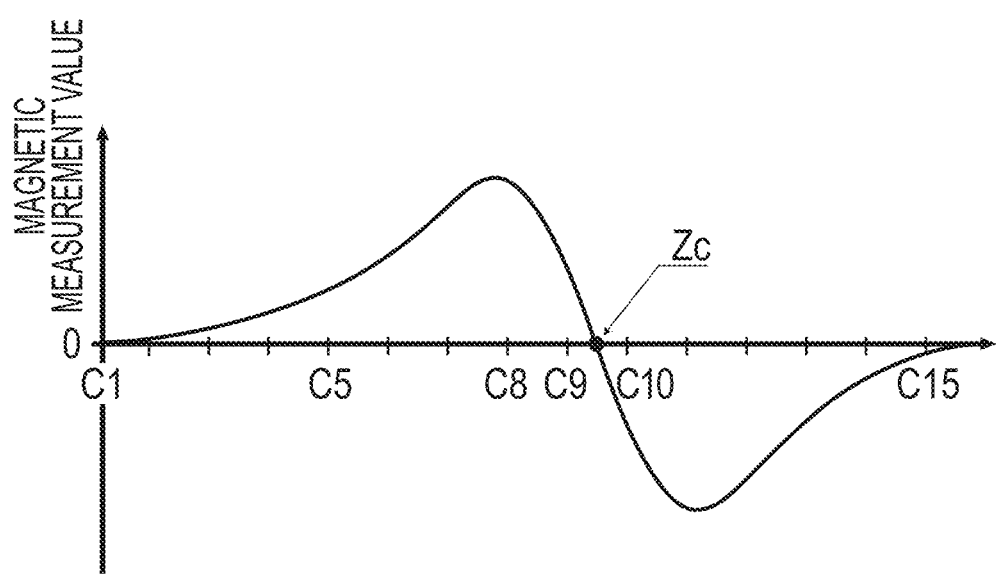
FIG. 7 is a descriptive diagram exemplarily describing a distribution curve of a magnetic measurement value in a vehicle-width direction by magnetic sensors Cn arrayed in the vehicle-width direction in the first embodiment

Based on FIG. 7 exemplarily depicting a distribution of magnetic measurement values in the vehicle-width direction by each magnetic sensor Cn of measurement unit 2, the position of zero-cross Zc where the sign of the magnetic measurement value in the vehicle-width direction is reversed is the position of magnetic marker 10 in the vehicle-width direction. For example, in the case of FIG. 7, the position of zero-cross Zc is a position equivalent to C9.5 near a midst between C9 and C10. Since the pitch between magnetic sensors C9 and C10 is 10 cm as described above, the lateral shift amount of magnetic marker 10 when exemplarily described in FIG. 7 is (9.5−8)×10 cm=15 cm, with reference to C8 positioned at the center of measuring unit 2. Note that the position of zero-cross Zc may be identified also with, for example, curve accumulation of the distribution of FIG. 7. Alternatively, the position of zero-cross Zc may be identified by applying an ideal distribution curve to, for example, the distribution of FIG. 7.

(3) Entire Operation of Vehicular System 1

Figure 8:
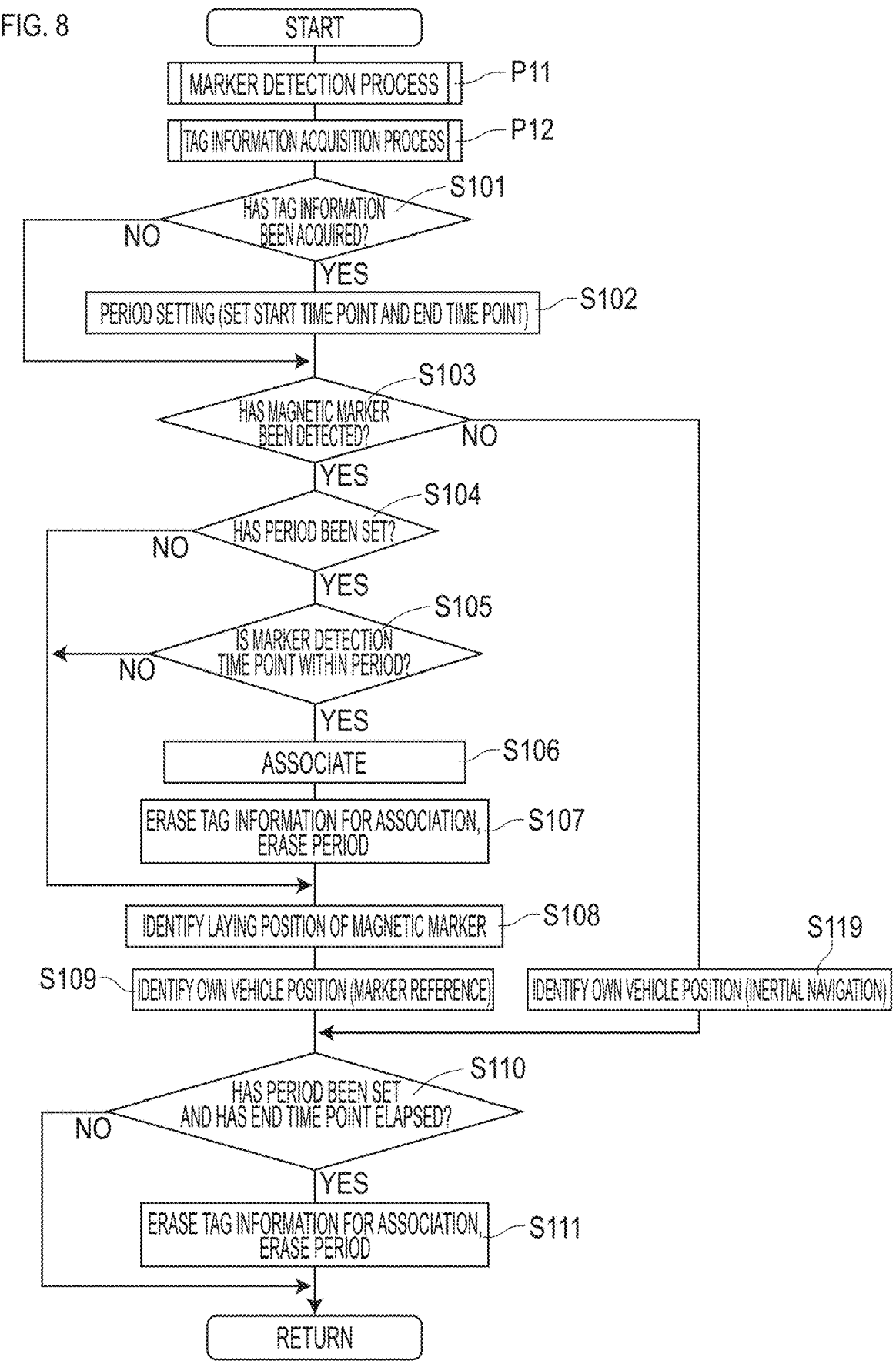
FIG. 8 is a flow diagram depicting operation of the vehicular system in the first embodiment.

An operation flow of vehicular system 1 exemplarily depicted in FIG. 8 exhibits a process loop of one cycle to be repeatedly and continuously performed during traveling of vehicle 5. Control unit 32 controls sensor array 21 and tag reader 34 so that marker detection process P11 and tag information acquisition process P12 described above are repeated once each every time this process loop is repeatedly performed. Note that, as described above, the execution frequency of the operation flow of FIG. 8 is 3 KHz.

In marker detection process P11, as described above, together with detection of magnetic marker 10, a lateral shift amount of vehicle 5 with respect to magnetic marker 10 is measured. Here, continuously performing tag information acquisition process P12 and so forth means repeatedly performing them with a substantially constant cycle without providing an intermission period. When tag information acquisition process P12 is repeatedly and continuously performed, the operation of tag reader 34 described above with reference to FIG. 5 is repeatedly and continuously performed.

When acquiring tag information from tag reader 34 (S101: YES), control unit 32 sets a period in which tag-equipped marker 10T corresponding to this tag information is detected, with reference to a time point of acquisition of the tag information (S102). Note that if tag information is not acquired (S101: NO), step S102 is passed, and processes at step S103 onward described below are performed.

Here, the period set at step S102 is retained until it is erased thereafter at S107 or S111 described below, even during execution of the next process loop onward. Also, the tag information acquired at tag information acquisition process P12 is retained as tag information for association until it is erased thereafter at S107 or S111 described below, during execution the next process loop onward.

Figure 9:
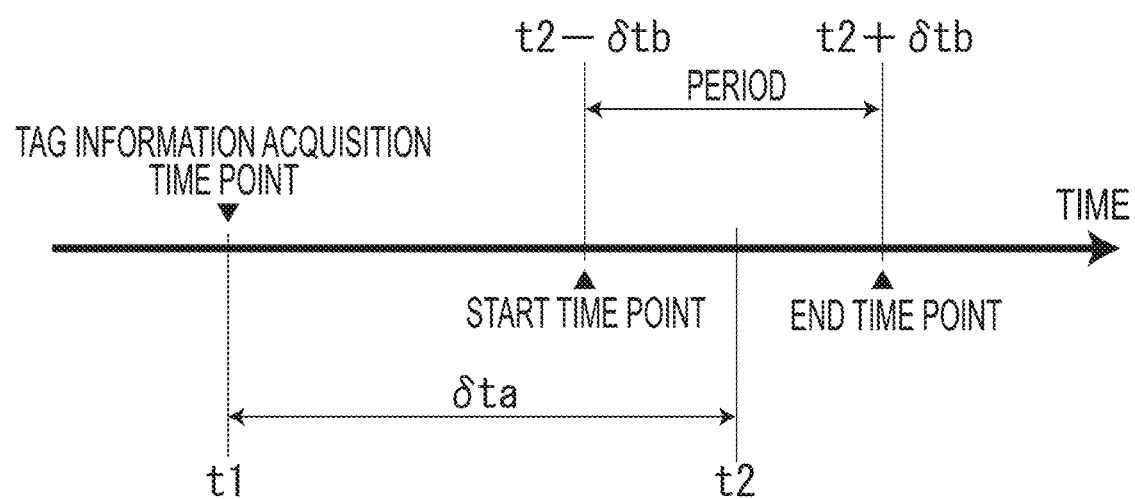
FIG. 9 is a descriptive diagram of a period set with reference to a tag information acquisition time point in the first embodiment.

At step S102, control unit 32 divides, as in FIG. 9, span S (m) between tag reader 34 and sensor array 21 by vehicle speed (speed of the vehicle) V (m/second), thereby calculating required time δta for passing the distance corresponding to span S. Then, control unit 32 adds this required time δta to time t1, which is the time point of acquisition of the tag information by tag reader 34. Note that vehicle speed V (m/second) can be calculated by integration of acceleration measured by IMU 22 described above.

By adding required time δta to time t1 in this manner, it is possible to predict time t2 when tag reader 34 passes a distance corresponding to span S described above after acquiring tag information. For example, when tag reader 34 acquires tag information directly above RFID tag 15, time t2 indicates a time point when sensor array 21 is positioned directly above its corresponding tag-equipped marker 10T.

Control unit 32 sets, as a start time point of the above-described period, a time (t2−δtb) obtained by subtracting zone time δtb obtained by dividing 1 m (meter), which is a reference distance, by vehicle speed V (m/second) from time t2, that is, a time when measuring unit 2 arrives 1 m before tag-equipped marker 10T. Also, control unit 32 sets, as an end time point of the above-described period, a time (t2+δtb) obtained by adding zone time δtb to time t2. Note that the reference distance for setting an end time point may be set longer than the reference distance for setting a start time point. This is because there is a possibility that radio waves of RFID tag 15 can be received on an upstream side in the forwarding direction of vehicle 5.

Control unit 32 sets this period, which is a temporal zone from the start time point to the end time point, as a period to which a predetermined timing when tag-equipped marker 10T corresponding to the tag information is detected can belong. In this manner, the predetermined timing when tag-equipped marker 10T corresponding to the tag information is a timing determined based on the distance (span S) between tag reader 34 and sensor array 21 (magnetic sensors Cn) in the longitudinal direction of vehicle 5 and the vehicle speed (speed of the vehicle).

Here, the period exemplarily depicted in FIG. 9 is a period set by assuming variations in timing when, after tag reader 34 disposed at a front part of vehicle 5 acquires tag information, sensor array 21 disposed at a rear part of the vehicle 5 detects its corresponding tag-equipped marker 10T. These variations are temporal variations occurring due to variations in distance between tag reader 34 and RFID tag 15 in the forwarding direction when tag reader 34 acquires tag information from RFID tag 15, variations in distance between the sensor array 21 and magnetic marker 10 in the forwarding direction when sensor array 21 detects magnetic marker 10, a measurement error of vehicle speed V, and so forth. Note in the present embodiment that the range of variations is adjusted by setting a reference distance, for example, 1 m or the like. This reference distance is preferably changed as appropriate in consideration of the degree of variations described above.

Subsequently, control unit 32 determines whether magnetic marker 10 has been detected (S103). If magnetic marker 10 has been detected (S103: YES), control unit 32 determines the presence or absence of the period set at step S102 described above (S104). If the period with reference to the time point of acquisition of the tag information is set (S104: YES), control unit 32 determines whether the time point (timing) of detection of magnetic marker 10 is within the period set at step S102 described above (S105).

If the time point of detection of magnetic marker 10 belongs within the period set with reference to the time point of acquisition of the tag information (S105: YES), control unit 32 performs process of associating the tag information retained for association as described above with magnetic marker 10 newly detected (tag-equipped marker 10T) (S106). When performing the process of associating the tag information (S106), control unit 32 erases the tag information for association and the information of the period (S107). Note that the tag information erased at step S107 is newly stored in, for example, a work area of the RAM or the like, as tag information for which the above-described associating process has been performed, that is, tag information most recently associated, and is retained as it is in the next process loop onward.

On the other hand, while magnetic marker 10 has been detected (S103: YES), if a period with reference to the time point of acquisition of the tag information is not set (S104: NO) or if the time point of detection of magnetic marker 10 not within this period (S104: YES→S105: NO), the associating process at step S106 and step S107 are bypassed.

If magnetic marker 10 has been detected (S103: YES) control unit 32 performs a process of identifying the laying position of that magnetic marker irrespective of whether tag information is associated with that magnetic marker 10 (S108). Control unit 32 refers to database 36 having stored therein position information indicating the laying position of magnetic marker 10 as described above, and performs this process at step S108.

If magnetic marker 10 is detected at the predetermined timing and tag information is associated (S105: YES→S106), control unit 32 refers to database 36 by using the tag ID included in that tag information, and identifies its corresponding tag-equipped marker 10T. Control unit 32 then acquires position information of that tag-equipped marker 10T, and identifies the laying position (S108).

On the other hand, when the tag information is no associated with the newly detected magnetic marker 10, control unit 32 reads most-recently-associated tag information already associated with tag-equipped marker 10T on the upstream side and stored in the work area as described above. Control unit 32 refers to database 36 by using the tag ID regarding that most-recently associated tag information and the number of detection of magnetic markers 10 after passage over that tag-equipped marker 10T. Control unit 32 first identifies tag-equipped marker 10T regarding that tag ID. Then, among the position information of magnetic markers 10 at the plurality of locations on the downstream side stored with its tag ID linked thereto in database 36, control unit 32 acquires position information of magnetic marker 10 positioned to the downstream side as many as the number of detection, and identifies the laying position (S108).

Upon identifying the laying position of magnetic marker 10 detected by marker detection process P11 described above in this manner (S108), control unit 32 identifies a position shifted from the laying position of magnetic marker 10 by the lateral shift amount measured at the time of detection as an own vehicle position (S109). This own vehicle position is referred to, as appropriate, as an own vehicle position of marker reference.

Note that the own vehicle position of the marker reference identified at step S109 is inputted to navigation ECU 61. Upon capturing the own vehicle position from control unit 32 as the own-vehicle-position identifying means, navigation ECU 61 reads map data of the surrounding area referring map DB 65 and causes a display device, not depicted in the drawing, to display it. Furthermore, if a route is set in advance, a route guide such as, for example, "turn right at the intersection 300 M ahead" is displayed or output as audio, in accordance with the location of the own vehicle position in the route.

On the other hand, if magnetic marker 10 has not been detected by marker detection process P11 described above (S103: NO), control unit 32 identifies the own vehicle position by estimating a relative position by inertial navigation using the most recent own vehicle position of marker reference identified in the previous process loop or earlier (S119) as a reference position. Here, the own vehicle position of marker reference is an own vehicle position identified at step S109 described above in response to detection of magnetic marker 10 with reference to its laying position.

Specifically, at step S119, control unit 32 identifies the own vehicle position by handling the most recent own vehicle position of marker reference as the reference position and estimating the relative position after passage over that reference position by inertial navigation. Control unit 32 estimates a momentary vehicle azimuth by integrating the angular velocity of vehicle 5 such as a yaw rate measured by IMU 22. Then, control unit 32 estimates the above-described relative position by accumulating displacement amounts calculated by double integration of measured acceleration by IMU 22 along the momentary vehicle azimuths. Control unit 32 identifies, as an own vehicle position, a position obtained by shifting from the reference position (own vehicle position of marker reference) by the relative position estimated as described above. Note that, as with the above-described own vehicle position of marker reference, this own vehicle position is inputted to navigation ECU 61, and is used, as with the above, for route guiding and so forth.

After identifying the own vehicle position at step S109 or step S119, if the period set in the previous process loop or earlier is retained, control unit 32 determines whether its end time point has elapsed (S110). Then, if the end time point of the period has elapsed (S110: YES), control unit 32 erases the tag information for association acquired in tag information acquisition process P12 in the previous process loop or earlier, and also erases the information about the period set with reference to the time point of acquisition of that tag information (S111).

Note that the tag information to be erased at step S111 is not stored in a work area of RAM or the like. In this work area, associated tag information acquired before the time point of acquisition of this tag information and stored in the work area in association with any tag-equipped marker 10T is retained as it is without being overwritten or the like. The associated tag information stored in the work area is erased when new tag information is associated with any tag-equipped marker 10T by the above-describing association process, by overwriting with that new tag information.

As described above, in the information acquisition method by vehicular system 1 of the present embodiment, after tag reader 34 arranged on the front side of vehicle 5 acquires tag information from RFID tag 15, when magnetic marker 10 is detected at the predetermined timing, the tag information is associated with that magnetic marker 10 (tag-equipped marker 10T). On the other hand, if magnetic marker 10 is not detected at the predetermined timing, the tag information read from RFID tag 15 is directly erased without being not associated with any magnetic marker 10. Note in the present embodiment that a timing belonging to the period set as in FIG. 9 is set as the predetermined timing when magnetic marker 10 (tag-equipped marker 10T) is to be detected.

In this manner, the information acquisition method of the present embodiment is an acquisition method in which, when tag information of RFID tag 15 is acquired, in accordance with the timing when magnetic marker 10 is detected, it is selectively determined whether to associate the tag information with magnetic marker 10 or not. According to this information acquisition method, it is possible to acquire, with high reliability, the tag information of RFID tag 15 regarding tag-equipped marker 10T as tag information regarding its corresponding tag-equipped marker 10T.

In general, compared with a range on which magnetic marker 10 acts with magnetism to its surroundings, the range on which radio waves transmitted from RFID tag 15 act is wide. Furthermore, radio waves transmitted from RFID tag 15 may be reflected on a vehicle traveling the road or a surface of a guard rail, billboard, or the like configuring a road environment, and may go farther than the design specifications of RFID tag 15. In the configuration of the present embodiment, even if tag reader 34 receives radio waves of RFID tag 15 affixed to tag-equipped marker 10T laid on a next lane and acquires its tag information, the possibility of erroneously associating that tag information with magnetic marker 10 on its own lane is less.

In the present embodiment, as a magnet forming magnetic marker 10, a columnar-shaped ferrite plastic magnet is exemplarily described. A sheet-shaped ferrite rubber magnet may be adopted. By adopting a bonded magnet formed by mixing magnetic powder into a binder made of a polymer material such as rubber or plastic, electrical internal resistance is increased, the occurrence of eddy current when electric power required for operation of RFID tag 15 can be suppressed, and electric power can be efficiently transferred. Note that the shape of the magnet forming magnetic marker 10 may be any shape other than the columnar shape and the sheet shape.

In the present embodiment, the configuration is exemplarily described in which RFID tag 15 is laminated and arranged on one end face (front surface) of the magnet forming magnetic marker 10 (tag-equipped marker 10T). In place of this, a configuration may be adopted in which RFID tag 15 is disposed on an outer circumferential surface (back surface or side surface) other than the front surface of the magnet, or a configuration may be adopted in which RFID tag 15 is partially or entirely buried inside the magnet.

Furthermore, when a sheet-shaped magnetic marker as described above is adopted in place of magnetic marker 10 in a columnar shape, it is possible to affix it onto road surface 100S without boring a hole in road surface 100S. To affix the RFID tag onto the sheet-shaped magnetic marker, RFID tag 15 may be laminated or arranged on its surface. Furthermore, a magnetic marker with two magnet sheets laminated together may be adopted. In this case, the RFID tag may be disposed between layers of the two magnet sheets.

In the present embodiment, the configuration is exemplarily described in which the tag information includes a tag ID with which its corresponding tag-equipped marker 10T can be identified. However, the tag information may include position information indicating the laying position of tag-equipped marker 10T. Furthermore, as for the tag information, various information may be added or may replace it, such as lane information including traveling lane and passing lanes, road information including branches and merges, and traffic information such as a speed limit and one-way.

In the present embodiment, the configuration is exemplarily described in which sensor array 21 is provided at one location on the rear side of vehicle 5. In place of this, sensor arrays 21 may be provided at two or more locations that are different in position in the longitudinal direction of vehicle 5. For each of sensor arrays 21 provided at two or more locations, a different period is set in accordance with the distance from tag reader 34 as a period to which a timing when tag-equipped marker 10T is to be detected belongs. In this case, by combining a plurality of detection results, a determination as to whether to associate the tag information with magnetic marker 10 may be made.

Also, in the present embodiment, magnetic sensors Cn with sensitivity in the longitudinal direction and the vehicle-width direction of vehicle 5 are adopted. Magnetic sensors Cn may have sensitivity in any one or two directions among the longitudinal direction, the vertical direction, and the vehicle-width direction. Magnetic sensors Cn may have sensitivity in three direction orthogonal to one another.

In the present embodiment, measurement unit 2 with sensor array 21 and IMU 22 integrated together is exemplarily described, but both may have separate configurations.

Also, in the present embodiment, the example is described in which the configuration of vehicular system 1 is applied to vehicle 5 traveling a road. However, vehicular system 1 may be applied to vehicles such as working vehicles for use in factories, residences, or the like.

In the present embodiment, the configuration is exemplarily described in which tag reader 34 repeatedly and continuously performs the tag information acquisition process during traveling of vehicle 5. In place of this, tag reader 34 may repeatedly perform the tag information acquisition process in a specific period such as a period in which vehicle 5 is traveling a zone where magnetic markers 10 are laid. This can reduce situations in which tag reader 34 acquires irrelevant tag information and is effective in view of energy saving, compared with the case of always performing the tag information acquisition process.

In the present embodiment, the configuration is exemplarily described in which sensor array 21 repeatedly performs the marker detection process during traveling of vehicle 5. In place of this, a configuration may be adopted in which sensor array 21 performs the marker detection process only in a period set with reference to the time point of acquisition of the tag information. By adopting this configuration, energy saving of electric power consumed in sensor array 21, control unit 32, and so forth can be achieved, compared with the case of always performing the marker detection process. Furthermore, in this configuration, when magnetic marker 10 is detected during the period, the marker detection process may be stopped without waiting for the end time point of the period. In this case, useless execution of the marker detection process by sensor array 21 can be avoided before it happens, and power consumption can be further reduced.

In the present embodiment, the configuration is exemplarily described in which a period is set with reference to the time point of acquisition of the tag information and the tag information is associated with magnetic marker 10 detected in that period. In place of this, a threshold value may be set to the strength of radio waves to be received by tag reader 34, and the process of associating the tag information with magnetic marker 10 may be performed only if the tag information is received with strong radio waves exceeding the set threshold value. By adjusting the above-described threshold value in accordance with the situations of the surroundings, such as laying situations of reflectors reflecting radio waves and wireless tags, it is possible to reduce possibilities of erroneously acquiring tag information of an RFID tag affixed to a magnetic marker (tag-equipped marker) other than magnetic markers 10 on its own lane.

Note that while part of magnetic markers among the plurality of magnetic markers arrayed along the road are taken as tag-equipped markers (magnetic markers to which the RFID tag is affixed) in the present embodiment, all may be tag-equipped markers.

Second Embodiment

The present embodiment is an example in which, based on the configuration of the first embodiment, conditions for associating the tag information are added. In the configuration of the present embodiment, to distinguish between a tag-equipped marker and a tag-unequipped marker, information about magnetic polarity of a magnetic marker to be detected on a vehicle side is used. Details of this are described by using FIG. 6 to FIG. 8 referred to in the first embodiment and FIG. 10.

Of magnetic markers 10, the direction of magnetism acting on the vehicle side is reversed in accordance with whether the magnetic polarity of the end face oriented to a top surface is the N pole or the S pole. For example, in the distribution curve of the magnetic measurement value of FIG. 6 or FIG. 7 referred to in the first embodiment, the positive/negative is reversed in accordance with whether the magnetic polarity on the top surface side of magnetic marker 10 is the N pole or the S pole. The magnetic polarity of the detected magnetic marker can be detected in accordance with the mode of the distribution curve of the magnetic measurement value exemplarily depicted in FIG. 6 or FIG. 7, that is, on which side of left and right of zero-cross the sign is positive and on which side the sign is negative.

In the present embodiment, for example, the following modes are exemplarily described as information about the magnetic polarity of magnetic marker 10 for distinguishing tag-equipped marker 10T.

(First Mode)

A first mode is a mode in which the magnetic polarity varies between a tag-equipped marker and a tag-unequipped marker. In this mode, for the tag-equipped marker, the magnetic polarity to be detected on the vehicle side is the N pole. For the tag-unequipped marker, the magnetic polarity to be detected on the vehicle side is the S pole.

In this mode, to the details of the determination at step S105 in FIG. 8 referred to in the first embodiment, a condition that the magnetic polarity of the detected magnetic marker is the N pole is added. In this case, if the timing when the magnetic marker is detected belongs inside the period set with reference to the time point of acquisition of the tag information and the magnetic polarity of the detected magnetic marker is the N pole, the process of associating the tag information with the detected magnetic marker is performed.

Note that, in place of this configuration, a mode may be adopted in which, for example, the magnetic polarity of a magnetic marker back from the magnetic marker equipped with the RFID tag, that is, one serving as a mark positioned on an upstream side in the forwarding direction of the road, is the N pole and the magnetic polarity of the other magnetic markers including tag-equipped markers is the S pole. For example, the magnetic polarity of a magnetic marker serving as a mark and exhibiting a predetermined positional relation with respect to the tag-equipped marker, such as only one magnetic marker adjacent to the tag-equipped marker on the upstream side or only one magnetic marker which is the third positioned magnetic marker to the upstream with respect to the tag-equipped marker, may be set different from those of the other magnetic markers. The magnetic marker serving as a mark is one example of a magnetic marker at one location among the plurality of magnetic markers, which exhibits a predetermined positional relation with respect to the tag-equipped marker, and the magnetic polarity of this magnetic marker is one example of a predetermined pattern.

Note in the first mode that it is not an indispensable condition that the magnetic polarity of the magnetic marker serving as a mark for distinguishing the tag-equipped marker be different from those of the other magnetic markers. When the magnetic polarities of magnetic markers are random, by defining the magnetic polarity of the above-described magnetic marker serving as a mark, a certain effect occurs that erroneous association of the tag information can be avoided with a 1/2 probability of the N pole or the S pole.

(Second Mode)

Figure 10:
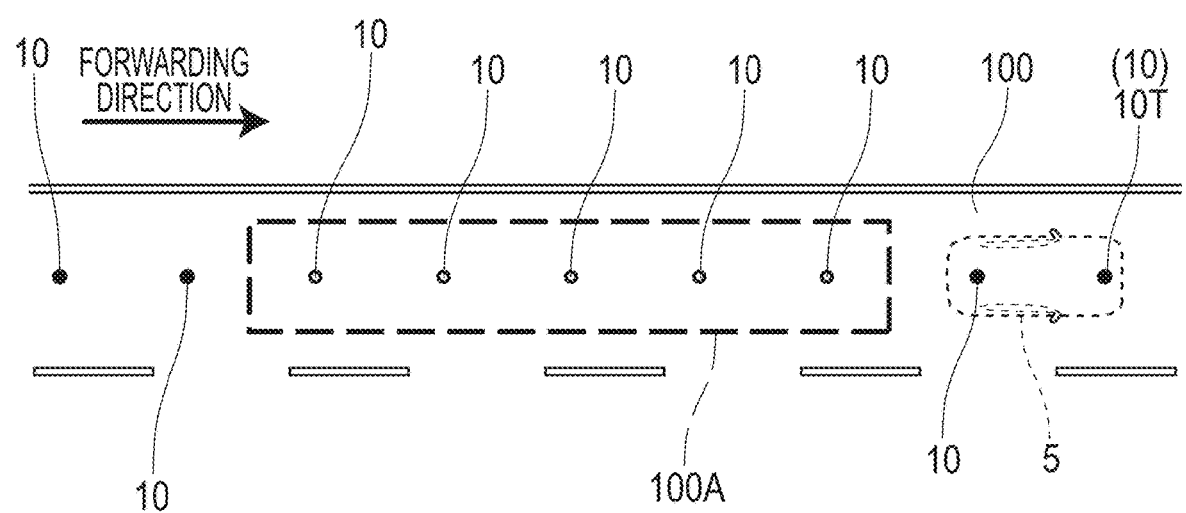
FIG. 10 is a descriptive diagram exemplarily depicting a combination of magnetic polarities of magnetic markers in a specific zone for distinguishing tag-equipped marker 10T in a second embodiment.

A second mode is a mode exemplarily depicted in FIG. 10 in which a specific combination is defined as a combination of magnetic polarities of magnetic markers 10 belonging to specific zone 100A on the upstream side of tag-equipped marker 10T. As a combination of magnetic polarities of magnetic markers 10 belonging to specific zone 100A, for example, a combination of five magnetic markers 10 all having the N pole or the S pole, a combination of, for example, eight magnetic markers 10, in which the magnetic polarity of each magnetic marker 10 when, for example, a bit value 1 indicates the N pole and a bit value zero indicates the S pole, and so forth are thought. Note that FIG. 10 depicts an example in which magnetic markers 10 in specific zone 100A all have the N pole. In the drawing, magnetic marker 10 with the N pole is indicated by a hollow circle and magnetic marker with its pole undefined is indicated by a solid circle. In place of this, magnetic marker 10 other than those in specific zone 100A may have the S pole.

In this mode, information about the combination of magnetic polarities of the plurality of magnetic markers 10 belonging to specific zone 100A described above is used as information for distinguishing tag-equipped marker 10T. As with the first mode, as a condition for associating the tag information with magnetic marker 10, a condition regarding the magnetic polarity of magnetic marker 10 may be set. Specifically, a condition may be set that the combination of magnetic polarities of the plurality of magnetic markers 10 belonging to specific zone 100A described above is a combination defined in advance in accordance with tag-equipped marker 10T.

The information about the combination of magnetic polarities of the plurality of magnetic markers 10 belonging to specific zone 100A described above is history information of magnetic markers 10 detected by vehicle 5. As specific zone 100A described above, tag-equipped marker 10T may be included or not included. Here, magnetic markers 10 belonging to specific zone 100A are one example of magnetic markers 10 at a plurality of locations exhibiting a predetermined positional relation with respect to tag-equipped marker 10T, and the combination of magnetic polarities of these magnetic markers 10 is one example of a predetermined pattern of magnetic polarities.

(Third Mode)

A third mode is a mode similar to the second mode, but is different from the second mode in that the combination of magnetic polarities of a plurality of magnetic markers belonging to the above-described specific zone is not constant. In the third mode, information about the combination of magnetic polarities of the plurality of magnetic markers belonging to the specific zone is incorporated in the tag information.

In this mode, it is set as a condition for associating the tag information with the magnetic marker that the combination of magnetic polarities of a plurality of magnetic markers belonging to the above-described specific zone matches the information included in the tag information. Note that a zone length of the specific zone and information such as the position relation of the specific zone with respect to the tag-equipped marker may be included in the tag information.

Note that the other configurations and the operation and effects are similar to those in the first embodiment.

In the foregoing, specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes techniques acquired by various modifying, changing, or combining as appropriate the above-described specific examples by using known techniques, knowledge of a person skilled in the art, and so forth.

REFERENCE SIGNS LIST 1 vehicular system
10 magnetic marker
10T tag-equipped marker
10N tag-unequipped marker
100 lane
100S road surface
15 RFID tag (wireless tag)
2 measuring unit
21 sensor array
Cn magnetic sensor
212 detection processing circuit
32 control unit (circuit, period setting means, associating means, own-vehicle-position identifying means)
34 tag reader
36 database
5 vehicle

The invention claimed is:

1. An information acquisition method for a vehicle including a magnetic sensor to acquire tag information outputted from a wireless tag affixed to a magnetic marker which is at least part of a plurality of magnetic markers arrayed along a traveling road, wherein
in the vehicle, a tag reader for acquiring the tag information by causing the wireless tag to operate by wireless power feeding is disposed on a front side of the magnetic sensor in a longitudinal direction of the vehicle, and
after the tag reader acquires the tag information of any wireless tag, when the magnetic sensor detects any magnetic marker at a predetermined timing, a process of associating the tag information with the any magnetic marker is performed, and
after the tag information of the any wireless tag is acquired, when the magnetic sensor cannot detect the any magnetic marker at the predetermined timing, the tag information is erased without performing the process of associating the tag information.

2. The information acquisition method in claim 1, wherein the tag reader continuously transmits radio waves for feeding electric power to the wireless tag.

3. The information acquisition method in claim 1, wherein the predetermined timing is a timing determined based on a distance between the tag reader and the magnetic sensor in the longitudinal direction of the vehicle and a speed of the vehicle.

4. The information acquisition method in claim 1, wherein a period to which the predetermined timing can belong is set with reference to a time point of the acquiring of the tag information, and
as a condition for performing the associating process, it is set that the timing when the any magnetic marker is detected belongs to the period.

5. The information acquisition method in claim 1, wherein, as a condition for performing the associating process, it is set that, among the plurality of magnetic markers, a magnetic polarity of a magnetic marker at one location or magnetic polarities of magnetic markers at a plurality of locations exhibiting a predetermined positional relation with respect to the magnetic marker with the wireless tag affixed thereto have a predetermined pattern.

6. The information acquisition method in claim 5, wherein information about the predetermined positional relation or information indicating the predetermined pattern is included in the tag information.

7. The information acquisition method in claim 1, wherein the vehicle includes a sensor array having a plurality of magnetic sensors linearly arranged therein, and the sensor array is attached to the vehicle so that an arraying direction of the plurality of magnetic sensors is along a width direction of the vehicle.

8. A vehicular system for a vehicle including a magnetic sensor to acquire tag information outputted from a wireless tag affixed to a magnetic marker which is at least part of a plurality of magnetic markers arrayed along a traveling road, wherein
in the vehicle, a tag reader for acquiring the tag information by causing the wireless tag to operate by wireless power feeding is disposed on a front side of the magnetic sensor in a longitudinal direction of the vehicle, and
the system comprises a circuit which performs, after the tag reader acquires the tag information of any wireless tag, when the magnetic sensor detects any magnetic marker at a predetermined timing, a process of associating the tag information with the any magnetic marker is performed, and
erases, after the tag information of the any wireless tag is acquired, when the magnetic sensor cannot detect the any magnetic marker at the predetermined timing, the tag information without performing the process of associating the tag information.

9. The vehicular system in claim 8, wherein the system further includes a circuit which sets a period to which the predetermined timing can belong with reference to a time point of the acquiring of the tag information.

10. The vehicular system in claim 8, wherein the system further includes: a database having unique information of the magnetic marker stored therein, and the unique information has linked thereto the tag information of the wireless tag in a state in which an order in position of a corresponding magnetic marker to a downstream side can be identified by taking the magnetic marker with the wireless tag affixed thereto as a starting point; and
a circuit which identifies a newly detected magnetic marker with reference to the database by using the tag information for which the associating process has been performed and a number of detection of other magnetic markers after passage over the any magnetic marker associated with the tag information.

11. The vehicular system in claim 10, wherein the system further includes a circuit which stores the tag information for which the associating process has been performed, and
the circuit storing the tag information is configured to, while storing any tag information and then storing the any tag information until new tag information is acquired and the associating process is performed for the new tag information, when the associating process is performed for the new tag information, overwrite the any tag information with the new tag information and erase the any tag information.

12. The vehicular system in claim 11, wherein the unique information of at least any of the plurality of magnetic markers has linked thereto, in parallel, the tag information of the wireless tag affixed to each of a plurality of magnetic markers different in position on an upstream side.

13. The information acquisition method in claim 2, wherein a period to which the predetermined timing can belong is set with reference to a time point of the acquiring of the tag information, and as a condition for performing the associating process, it is set that the timing when the any magnetic marker is detected belongs to the period.

14. The information acquisition method in claim 3, wherein a period to which the predetermined timing can belong is set with reference to a time point of the acquiring of the tag information, and as a condition for performing the associating process, it is set that the timing when the any magnetic marker is detected belongs to the period.

15. The information acquisition method in claim 2, wherein, as a condition for performing the associating process, it is set that, among the plurality of magnetic markers, a magnetic polarity of a magnetic marker at one location or magnetic polarities of magnetic markers at a plurality of locations exhibiting a predetermined positional relation with respect to the magnetic marker with the wireless tag affixed thereto have a predetermined pattern.

16. The information acquisition method in claim 3, wherein, as a condition for performing the associating process, it is set that, among the plurality of magnetic markers, a magnetic polarity of a magnetic marker at one location or magnetic polarities of magnetic markers at a plurality of locations exhibiting a predetermined positional relation with respect to the magnetic marker with the wireless tag affixed thereto have a predetermined pattern.

17. The information acquisition method in claim 4, wherein, as a condition for performing the associating process, it is set that, among the plurality of magnetic markers, a magnetic polarity of a magnetic marker at one location or magnetic polarities of magnetic markers at a plurality of locations exhibiting a predetermined positional relation with respect to the magnetic marker with the wireless tag affixed thereto have a predetermined pattern.

18. The information acquisition method in claim 17, wherein information about the predetermined positional relation or information indicating the predetermined pattern is included in the tag information.

19. The vehicular system in claim 9, wherein the system further includes: a database having unique information of the magnetic marker stored therein, and the unique information has linked thereto the tag information of the wireless tag in a state in which an order in position of a corresponding magnetic marker to a downstream side can be identified by taking the magnetic marker with the wireless tag affixed thereto as a starting point; and a circuit which identifies a newly detected magnetic marker with reference to the database by using the tag information for which the associating process has been performed and a number of detection of other magnetic markers after passage over the any magnetic marker associated with the tag information.

20. The vehicular system in claim 19, wherein the system further includes a circuit which stores the tag information for which the associating process has been performed, and the circuit storing the tag information is configured to, while storing any tag information and then storing the any tag information until new tag information is acquired and the associating process is performed for the new tag information, when the associating process is performed for the new tag information, overwrite the any tag information with the new tag information and erase the any tag information.

* * * * *